Figure 1:
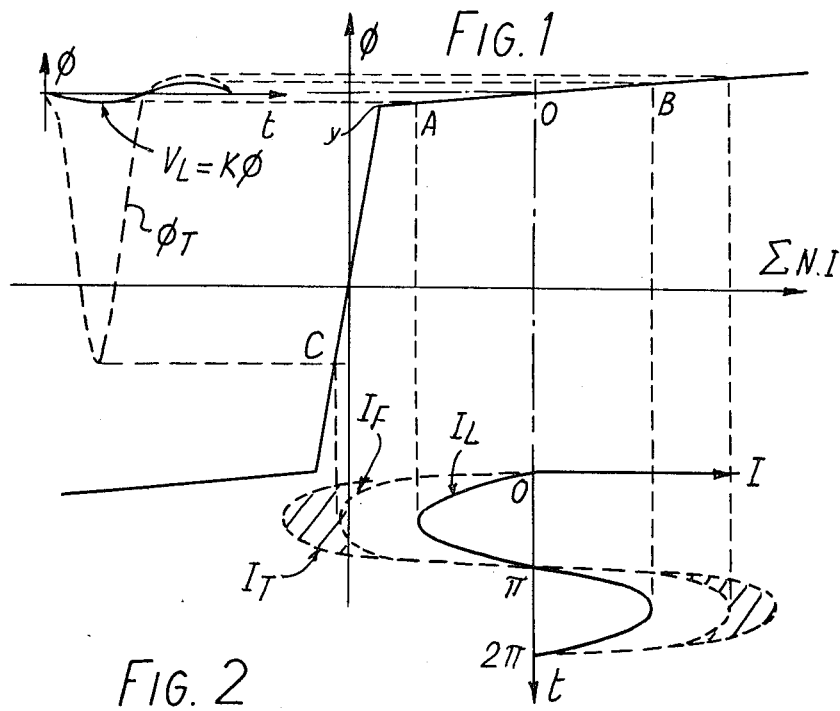

United States Patent [19]

Parton et al.

[11] 4,117,524
[45] Sep. 26, 1978

[54] CURRENT-LIMITING DEVICES

[75] Inventors: Kenneth Charles Parton, Sutton Coldfield; Anthony Derek Appleton; Trevor Carlisle Bartram, both of Newcastle upon Tyne, all of England

[73] Assignee: Reyrolle Parsons Limited, Newcastle upon Tyne, England

[21] Appl. No.: 728,837

[22] Filed: Oct. 1, 1976

[30] Foreign Application Priority Data

Oct. 3, 1975 [GB] United Kingdom ............... 40628/75

[51] Int. Cl.² .............................................. H02H 3/08
[52] U.S. Cl. ......................................... 361/19; 323/9; 336/DIG. 1; 361/58
[58] Field of Search ............. 361/58, 19; 323/9, 44 F; 336/155, DIG. 1; 307/20, 245, 306; 335/301

[56] References Cited

U.S. PATENT DOCUMENTS

| 3,221,280 | 11/1965 | Malsbary et al. ............... 336/155 X |
| 3,671,810 | 6/1972 | Barnes ................................. 361/58 |
| 3,703,664 | 11/1972 | Cronin ................................ 361/58 |
| 4,015,168 | 3/1977 | Massar ............................. 323/9 X |
| 4,045,823 | 8/1977 | Parton ............................... 361/58 |

*Primary Examiner*—Patrick R. Salce
*Attorney, Agent, or Firm*—Robert F. O'Connell

[57] ABSTRACT

A current-limiting device for an alternating current system has for each phase a pair of saturable reactors each with an iron core, an alternating current winding and a superconducting direct current bias winding which is common to the reactor cores and biases them both to saturation. The two alternating current windings in each phase are connected in series opposition such that under fault conditions they are driven out of saturation on alternate half-cycles and thus limit the overload current. The superconducting winding has a surrounding magnetic flux screen which also forms a loop for shunting alternating current under fault conditions and which may be used as a direct current control circuit for varying the bias level. The screen serves as the outer vessel of an evacuated enclosure for the superconducting winding and a suppot system for the inner vessel is also described.

13 Claims, 10 Drawing Figures

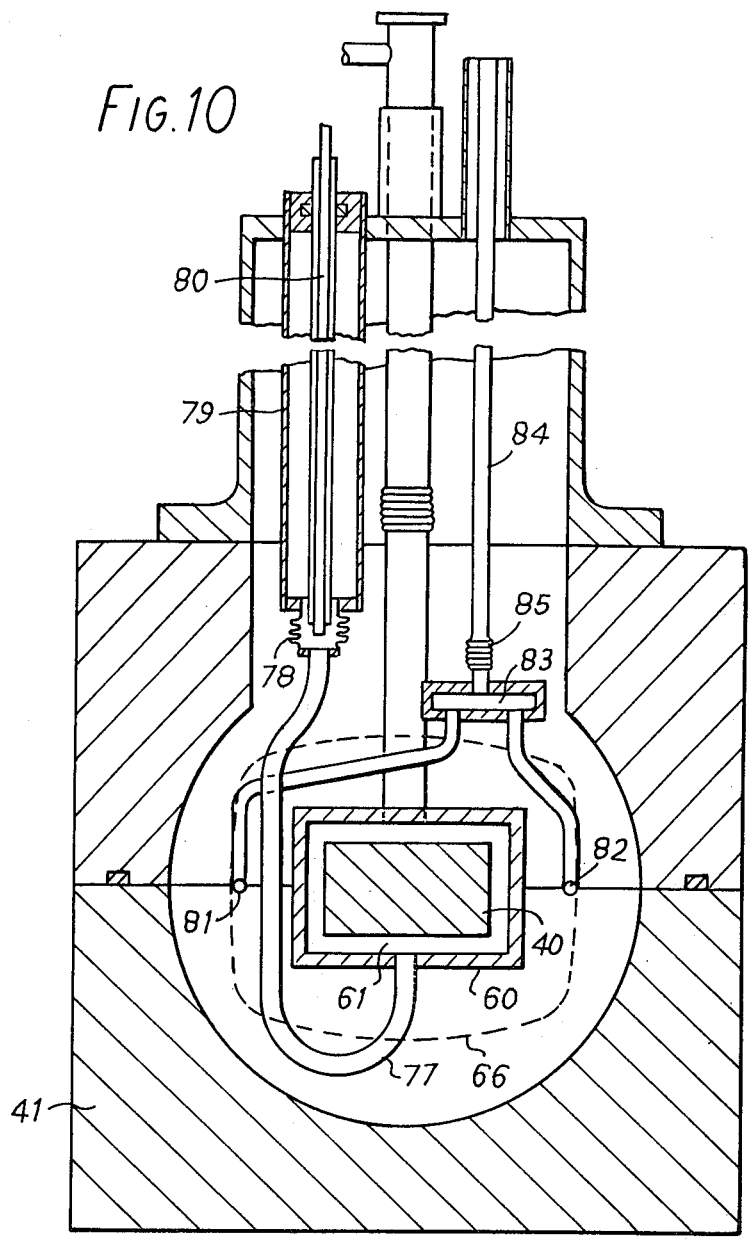

CURRENT-LIMITING DEVICES

The present invention relates to current-limiting devices for alternating-current supply and distribution systems.

It is an object of the invention to provide a current-limiting device capable of better performance in such alternating current systems, for a comparable expenditure, than existing current-limiting devices. For example such devices are required to prevent the current in any branch of an alternating current network exceeding a designed limit, even in the event of a short circuit or switching overload. The devices must operate under initial transient conditions and/or steady state, balanced or unbalanced conditions, and preserve system stability. Such devices will reduce the demands made on the switch gear of the system and other components which are affected by the system fault level rating.

U.S. patent application Ser. No. 648,980 filed Jan. 14, 1976, now U.S. Pat. No. 4,045,823 in the name of K. C. Parton describes a current-limiting device for an alternating current system having in each phase a pair of opposed saturable reactors whose cores are maintained in saturation by a superconducting direct current bias winding common to the cores while the alternating current windings of the reactors are under full load but are forced out of saturation on alternate half cycles if there is a fault and then act to limit the overload current.

The present invention concerns improvements in the current-limiting device of the aforesaid application Ser. No. 648,980, to which the reader is referred for additional details of the prior device and of various applications of current-limiting devices of this character.

In the device of the prior application the superconducting bias winding was exposed to alternating magnetic flux from the alternating current system. Under normal full load conditions the fields of the alternating current windings on the two reactor cores tend to cancel each other out in some measure but there may still be residual fields acting on the bias winding. Such alternating fields acting on a superconducting winding tend to heat the winding and thus return it to a normal conductivity condition in which it cannot carry the necessary direct current for saturating the reactor cores. The risk of disturbance is very much greater under fault conditions in the alternating current circuit because the action of the current limiter produces an asymmetry in the alternating fields generated.

Accordingly the invention proposes the provision of a flux screen of electrically-conductive material surrounding the superconducting winding to screen it against alternating mgnetic flux. Such a screen does not affect the unchanging field of the bias winding, which continues to saturate the reactor cores, but alternating fields external to the screen are absorbed by the generation of alternating currents in the screen and do not penetrate to the superconducting winding.

The screen preferably provides a closed loop for the circulation of alternating current which is electrically independent of but physically in parallel with the superconducting bias winding. Under fault conditions this closed loop provides a shunt for alternating currents.

The screen may also form part of a direct current control loop in parallel with the superconducting winding which enables the bias level of flux in the reactor cores to be varied more easily than by direct control of the current in the superconducting winding.

Instead of the screen, or in addition thereto, it is possible to use a separate normally-conducting winding disposed in parallel with, but electrically independent of, the superconducting winding to act as a shunt under fault conditions. This auxiliary winding may also be used as a direct current control loop for varying the bias level in the reactor cores.

In a preferred constructional form of the invention the superconducting winding with its surrounding screen forms an elongated loop in a horizontal plane which links the reactor cores and a number of air-gap magnetic cores. The superconducting winding is surrounded by liquid helium within an inner vessel and the screen forms an outer vessel, the space between the two vessels being evacuated. The inner vessel is suspended within the outer vessel by tensional ropes, preferably of synthetic plastic filaments, which zig-zag between the walls of the inner and outer vessels in a vertical plane, there being one rope above and one below the inner vessel.

Figure 2:
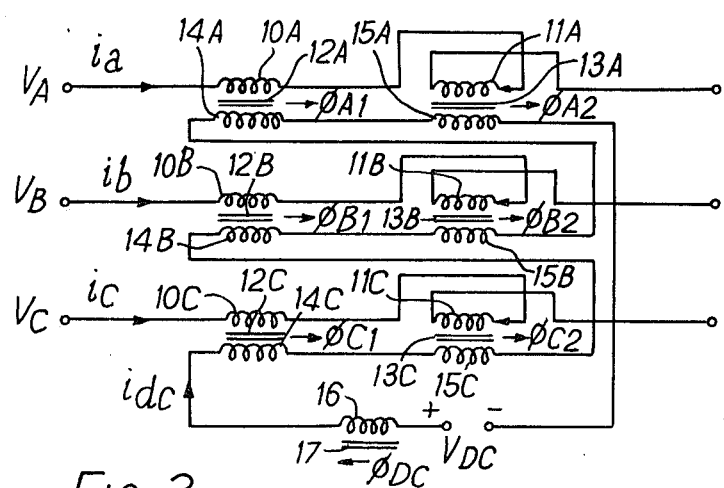
Figure 3:
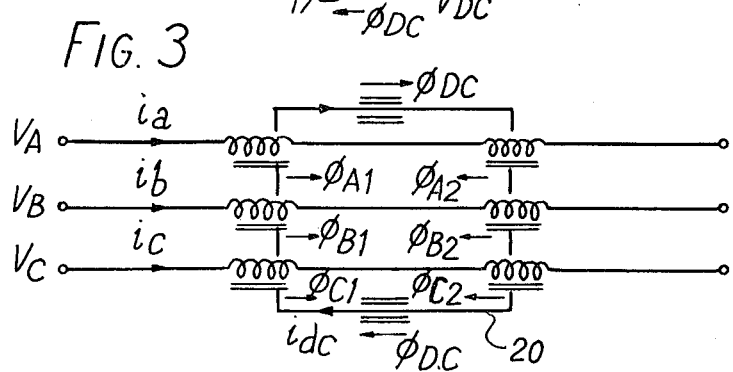
Figure 4:
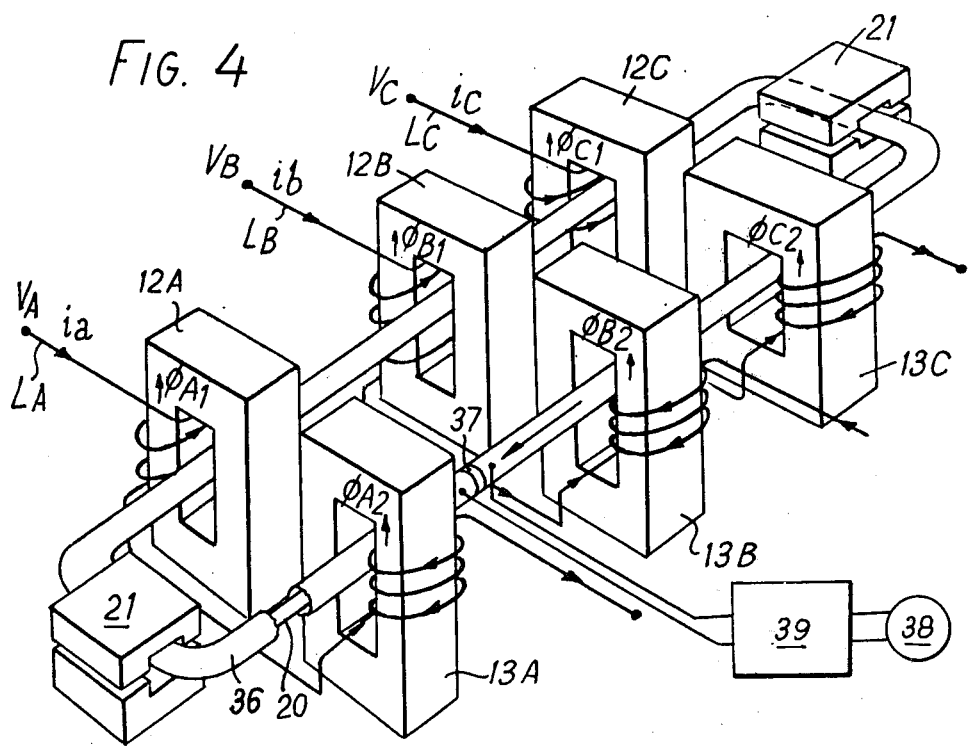
Figure 5:
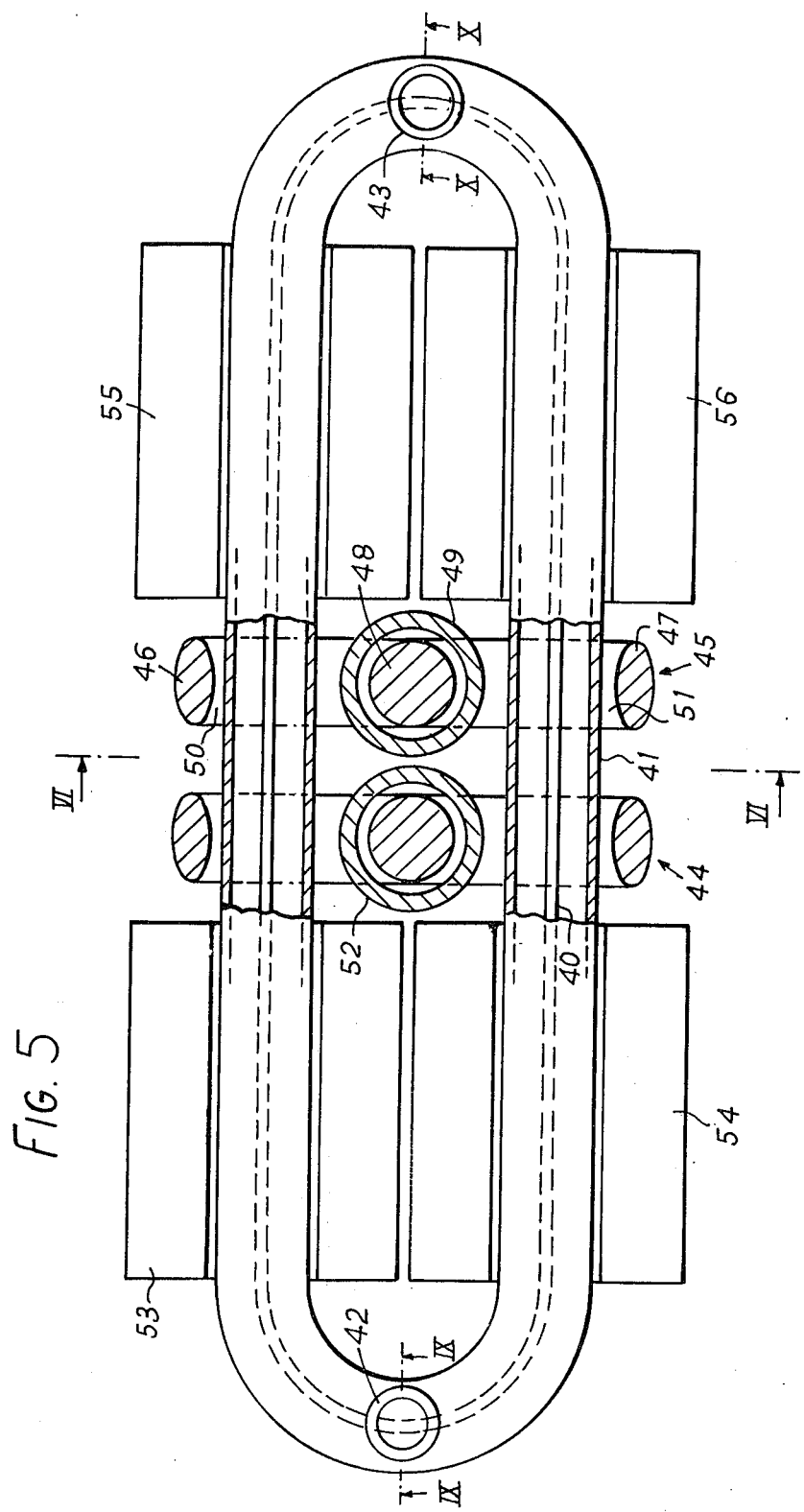
Figure 6:
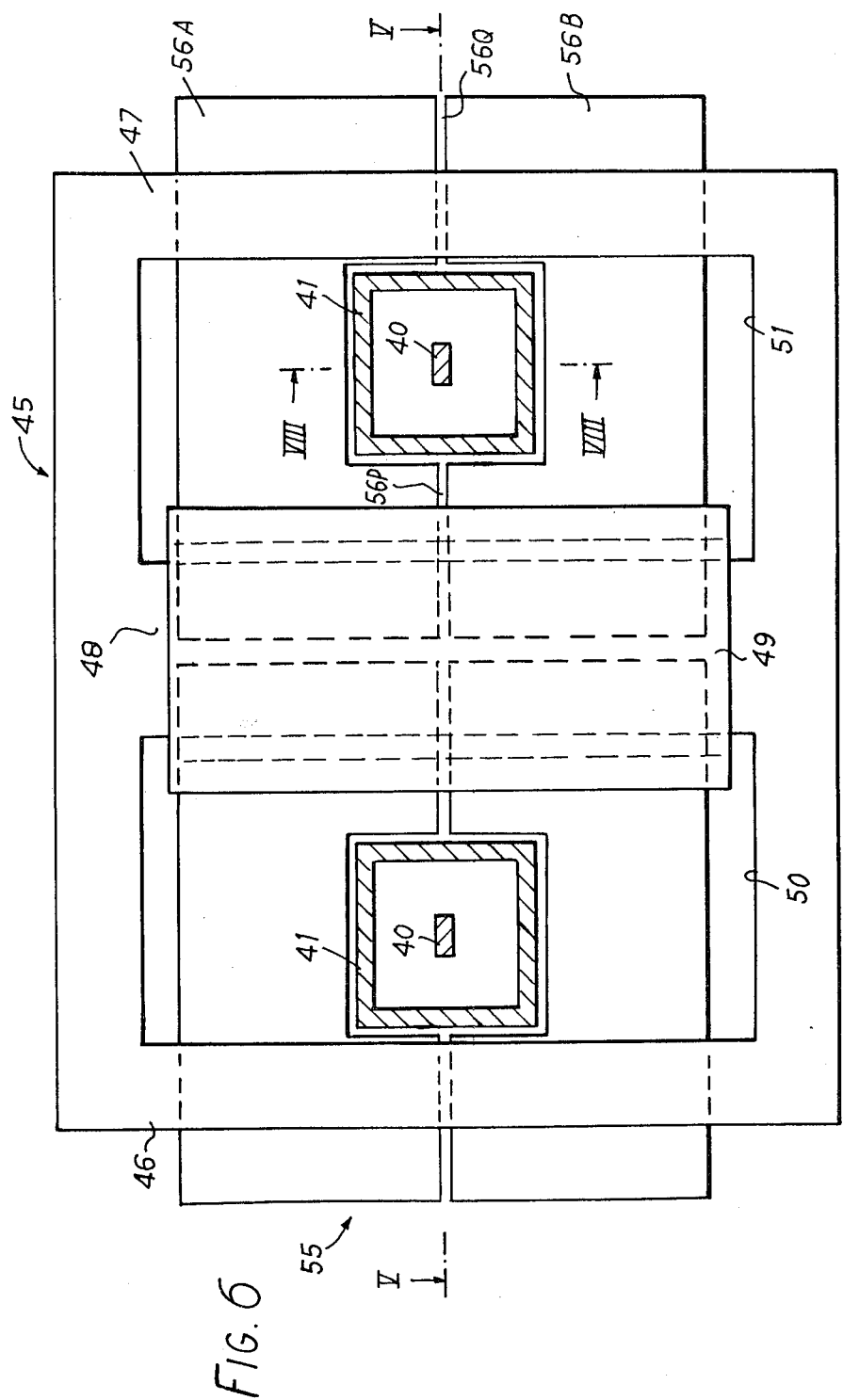
Figure 7:
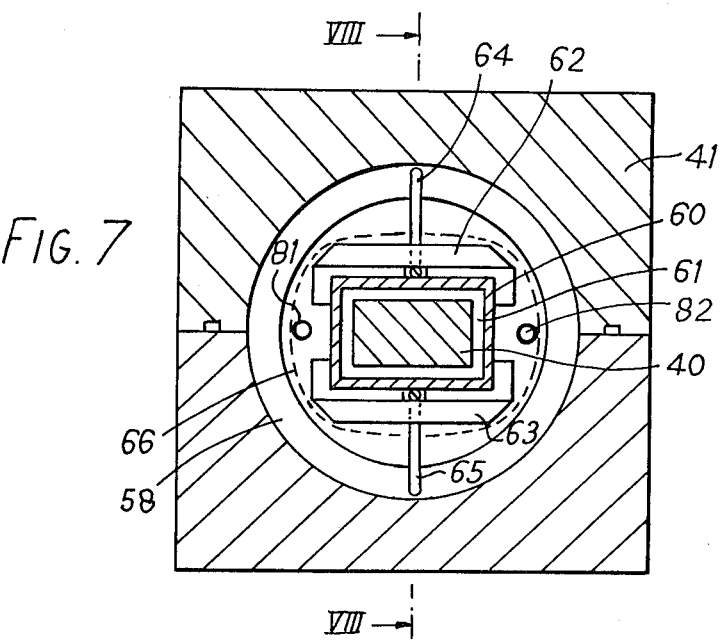
Figure 8:
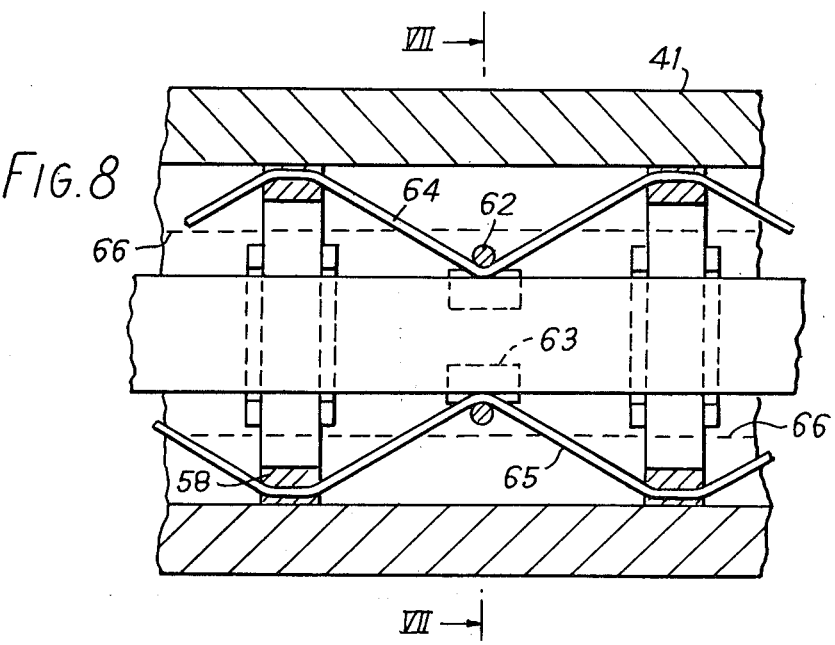
Figure 9:
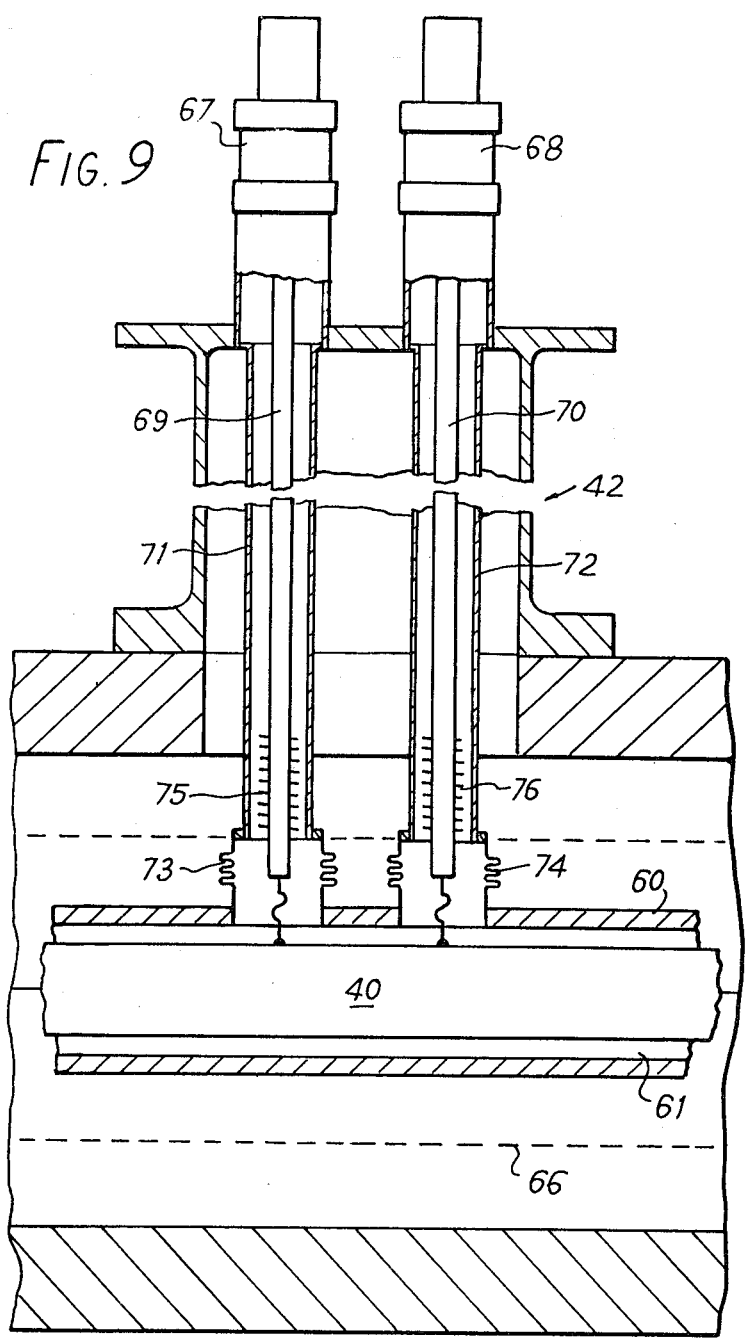

The invention will now be described in more detail with the aid of examples illustrated in the accompanying drawings, in which:

FIG. 1 is a graph of flux against magnetising ampere turns for a saturable reactor used in a current-limiting device in accordance with the invention, showing flux and current waveforms illustrating the current-limiting operation, FIG. 2 is a schematic circuit diagram for a current-limiting device in accordance with the invention, FIG. 3 is a schematic circuit diagram of a modification of the device of FIG. 2, FIG. 4 is a perspective view showing in a diagrammatic manner a current-limiting device in accordance with the invention for a three-phase system, FIG. 5 is a plan view, partially in section, of a current limiting device in accordance with the invention for a single phase with a physical layout differing from that of FIG. 4, FIG. 6 is a section on the line VI—VI of FIG. 5 and shows a line V—V the plane of FIG. 5, FIG. 7 is a detail of FIG. 6 showing on an enlarged scale and in more detail the superconducting winding and its mounting within the magnetic flux screen, FIG. 8 is a section on the line VIII—VIII of FIG. 7 and shows by a line VII—VII the plane of FIG. 7, FIG. 9 is a detail section on the line IX—IX of FIG. 5, and FIG. 10 is a detail section on the line X—X of FIG. 5.

FIG. 1 shows the relationship of flux $\phi$ and magnetising ampere turns $\Sigma NI$ for an iron core of a saturable reactor of the type used in a current-limiting device in accordance with the invention. The curve has a "knee" at the saturation point $y$. Normally the D.C. control current in a bias winding maintains the core in a saturated condition at the point O of the curve and the normal full load current $I_L$ in the alternating current winding causes a sinusoidal variation of the flux $\phi$ about the point O between points A and B, the core remaining saturated. There is in consequence a residual series voltage drop of $V_L = K.\Delta\phi$ across the saturable reactor where $\Delta\phi$ is the flux change between points O and A and K is a constant.

Upon the occurrence of a fault, however, an increase in load current will, in the negative half cycle, force the flux $\phi_T$ down below the point $y$ to a point such as C, causing a large flux swing and hence an induced EMF acting in opposition to the supply voltage. The fault current is thereby limited and would follow the curve $I_F$ but an additional component is required to supply the increased ampere turns needed by the self inductance of the bias winding, resulting in a total current $I_T$. The self inductance of the bias winding is desired to remain linear in the control region or to suit the particular current limitation required.

It will be appreciated that if the alternating current winding is split into two equal halves on separate iron cores and these are connected with opposite polarities relative to a common direct current bias winding, the second core will operate in a similar manner to that described above but during the opposite half cycle of the alternating current. The device will thus be symmetrical in its effect on the alternating current and no fundamental components of current or flux will be induced in the direct current winding. The alternating current under fault conditions is not sinusoidal for the simple case illustrated but in practice the waveform $I_F$ can readily be modified.

The circuit diagram of FIG. 2 shows a three-phase alternating current system having voltages $V_A$, $V_B$ and $V_C$ and currents $i_a$, $i_b$ and $i_c$, respectively, in the three phases. Each phase includes two windings 10 and 11 (which are given the suffixes A, B and C in the drawing to indicate the phases to which that belong) which are connected in series and arranged on separate saturable reactor cores 12 and 13 in opposite senses. The cores 12 and 13 have series connected direct current control windings 14 and 15, respectively, all the control windings being connected in a common circuit supplied with voltage $V_{DC}$ giving a current $i_{dc}$. Although shown as separate the control windings are preferably formed as a single winding common to all the reactor cores, as will be described below. The control circuit includes flux cores to give it the necessary self inductance under fault conditions as illustrated by a winding 16 associated with a core 17. The fluxes in the cores 12 and 13 are indicated by $\phi_1$ and $\phi_2$, respectively, with the subscripts A, B and C for the three phases. The flux in the core 17 is indicated by $\phi_{DC}$.

In a modification shown in FIG. 3 the control circuit is a single loop 20 common to all the reactor cores. The loop 20 is a superconducting coil in which a fixed direct bias current circulates continually without external connections.

In FIG. 4 the physical layout of the circuit shown in FIG. 3 is illustrated schematically. The pairs of reactor cores 12 and 13 for the three phases are arranged to link the single superconducting coil 20 which is provided with non-saturating air-gap magnetic cores 21 to increase the self-inductance of the direct current winding. A number of cores 21 are distributed around the superconducting coil 20 and in addition to providing the required self-inductance act as mechanical supports for the coil. Whereas the cores 12 and 13 are shown in FIG. 4 as rectangular cores, they may be toroidal and this would improve the performance of the device by reducing the equivalent series reactance under normal load, reducing losses, and facilitating more accurate control.

There is a need to minimise the level of alternating magnetic flux affecting the superconducting control winding because this leads to internal temperature rise and the possibility of reversion to normal conductivity. This is achieved without interference with the steady flux generated by the superconducting winding itself by the provision of a normally conducting flux screen around the superconducting winding.

The superconducting winding 20 and its cryostat are enclosed in a metallic, normally-conducting, hollow tubular magnetic flux screen 36 of circular cross-section, which may form the outer vessel of the cryostat. The wall thickness of the screen 36 is designed to be greater than the penetration skin depth for alternating currents of the lowest frequency which may be induced by magnetic coupling with the reactor core. Under normal conditions the variation of flux in the reactor cores is small and the alternating current in the screen 36 is minimal. However under fault conditions the flux changes are substantial and alternating skin currents are induced in the screen, which thus protects the superconducting winding 20.

The normally-conducting magnetic flux screen or a separate normally-conducting winding can be physically disposed in parallel with the superconducting winding to act as an auxiliary control winding. In the case of a separate winding this can be associated with its own self-inductance elements in the form of air-gap magnetic cores and may also include further resistance, inductance and capacitance elements. By way of example FIG. 4 shows the flux screen 36 as having a gap or electrically-insulating section 37 on either side of which connections are made to a current source 38 by way of a control device 39 which enables the current in the flux screen to be switched from one direction in which it aids the flux of the bias winding 20 to another direction in which it opposes the flux of the bias winding.

The impedance presented by the current source 38 and control device 39 to alternating currents circulating around the flux screen 36 is kept low so that the flux screen, in addition to the flux screening function, can also provide a shunt path for alternating currents under fault conditions. The shunt path may also be provided by a separate normally-conducting winding which lies physically in parallel with the superconducting winding but has neither screening nor control functions.

While the flux screen 36 is physically in parallel with the superconducting winding, that is to say it follows a similar path and links the same magnetic cores, it will be appreciated that it is electrically independent. While the main superconducting winding always carries the same current, the current in the auxiliary winding or screen can be more easily and rapidly varied to change the total flux in the reactor cores.

In FIG. 5 a superconducting loop winding 40 is disposed within an enclosing magnetic flux screen 41. The screen 41 has a current lead port 42 at one end of the loop for the passage of current leads connected to the winding 40 and a helium access port 43 at the other end of the loop for the entry of liquid helium for cooling the superconducting winding 40. Parts 42 and 43 will be described below with reference to the sections of FIGS. 9 and 10, which show them in more detail. The winding 40 and the screen 41 form a parallel-sided loop and at the middle of the length of the loop two reactor cores 44 and 45 are linked by the loop. As seen in FIGS. 5 and 6 the core 45 has two outer vertical limbs 46 and 47 of generally elliptical cross-section and a central vertical limb 48 of circular cross-section. An alternating current coil 49 is wound on the central limb 48. The superconducting loop winding 40 and the enclosing screen 41 pass through windows 50 and 51 in the core 45 on opposite sides of the central limb 48. The reactor core 44 is essentially of the same form as the core 45 and is arranged in the same way with an alternating current coil 52 wound on its central limb.

The two coils 49 and 52 are connected in series in a single phase alternating current system in a similar manner to the A.C. windings of a single phase in the embodiment of FIG. 4. The winding directions of the two coils and the interconnections between them are such that they are opposed to one another with respect to the flux in the central limbs of their respective cores which is generated by the winding 40.

It will be appreciated that the construction shown in FIGS. 5 and 6 conforms to one phase of the circuit diagram of FIG. 3 and its basic manner of operation is the same as that described above in relation to FIGS. 1 to 4. The screen 41 serves firstly to prevent penetration of alternating magnetic flux into the superconducting winding 40. Any such flux is dissipated by eddy currents in the screen. The screen also forms a closed electrical loop in parallel with but independent of the superconducting winding and under fault conditions this acts as a shunt for alternating currents which circulate in the loop.

The closed loop of normally-conducting material formed by the screen may also be employed as a control circuit to which direct control is supplied, as described in connection with the embodiment of FIG. 4, in order to vary the bias level in the reactor cores.

On each side of the two reactor cores 44 and 45, pairs of air-gap magnetic cores 53, 54 and 55, 56 are disposed about the bias winding 40 and, as seen for example on the right hand side of FIG. 6, each of these cores consists of upper and lower halves 56A and 56B, separated by gaps 56P and 56Q located on each side of the winding 40.

Turning now to FIGS. 7 and 8, these show the screen 41 as being a hollow metallic conductor of square cross-section with a central passage of circular section. The screen is composed of electrically-conductive material, such as aluminium, and must have a wall thickness greater than the penetration skin depth for alternating currents of the lowest frequency which can be induced by magnetic coupling with the alternating current circuit. The super-conducting winding 40 is surrounded by an inner vessel 60 which contains liquid helium in the space 61 between the winding 40 and the wall of the vessel 60. Fitted to the outside of the vessel 60 on its top and bottom at intervals along the length of the vessel are cable-clamping brackets 62 and 63. The vessel 60 is supported in the screen 41 by upper and lower tensioned ropes 64 and 65 which are disposed in a vertical plane and zig-zag between the wall of the vessel 60, where they pass under the cable clamping brackets 62 and 63, respectively, and the inner surface of the screen 41, where they are fixed by support rings 66 arranged in alternation with the brackets 62 and 63 along the length of the winding 40. The ropes 64 and 65 are synthetic plastic fibre ropes to minimize heat transmission between the screen and the super-conducting winding. The space between the vessel 60 and the screen 41 is evacuated and a thermal radiation shield 66 is mounted in the evacuated space to reduce entry of heat into the vessel 60. The shield 66 is fitted around the cable clamping brackets 62 and 63 and is divided into two halves by longitudinal gaps at top and bottom through which the ropes 64 and 65 pass.

FIG. 9 shows how the screen 41, which forms the outer vessel of the evacuated enclosure surrounding the superconducting winding 40 is provided with the current lead port 42 for the entry of current leads 67 and 68. The leads 67 and 68 have central conductors 69 and 70 respectively, which are connected to the superconducting coil 40. Surrounding the conductors 69 and 70, within the vacuum space, are tubular shields 71 and 72, respectively, which are connected by expansion bellows 73 and 74, respectively, to the vessel 60 containing the winding 40. The conductors 69 and 70 are equipped with cooling fins 75 and 76, respectively.

FIG. 10 shows the helium access port 43. A liquid helium inlet pipe 77 enters the vessel 60 at the bottom. The inlet pipe 77 is coupled by an expansion bellows 78 to a tubular shield 79, within which extends a liquid helium transfer pipe 80. The liquid helium fills the space within the vessel 60 in order to maintain the superconducting winding 40 at the very low temperature required for superconductivity. Some of the helium boils off and a helium gas outlet is provided on the upper side of the vessel 60 at a point close to the current lead port 42 at the other end of the vessel from the liquid inlet. The helium gas from this outlet (not shown) returns by way of return pipe 81 and 82 along the inside of the radiation shield 66 to a header 83 and a helium gas discharge pipe 84 which extends through the port 43. The pipe 84 has an expansion bellows 85. The return pipes 81 and 82, which are also seen in FIG. 7, are mounted on the inner face of the radiation shield 66 and serve to cool this shield.

We claim:

1. A current-limiting device for an alternating current system comprising for each phase of the system at least two iron-cored saturable reactors, each reactor having an alternating current winding and a direct current superconducting bias winding, the bias winding being common to the reactors of that phase and establishing a bias level of saturation in the reactor cores such that the reactor cores are maintained saturated under full load alternating current conditions, said bias winding having a surrounding screen of electrically-conductive material shielding the direct current bias winding against alternating magnetic flux, and the alternating current windings of each phase being so arranged and connected that under full load conditions a change in the level of saturation in any one reactor core relative to the bias level due to the bias winding is accompanied by a compensating change in saturation level in another core or cores, current limiting occurring when on each half-cycle one of the cores is forced out of saturation.

2. A current-limiting device as claimed in claim 1 having at least one air-gap magnetic core linked by the bias winding.

3. A current-limiting device as claimed in claim 1 wherein said screen provides a closed loop for the circulation of alternating current which is electrically independent of but physically in parallel with the superconducting bias winding.

4. A current-limiting device as claimed in claim 1 wherein said screen forms part of a direct current control circuit for varying the bias level of said reactor cores.

5. A current-limiting device for an alternating current system comprising for each phase of the system at least two iron-cored saturable reactors, each reactor comprising an iron core, an alternating current winding on said core, a direct current superconducting bias winding and an auxiliary direct current bias winding of normal conductivity material linking said core, said bias windings being common to the reactors of that phase and establishing a bias level of saturation in the reactor cores such that the reactor cores are maintained saturated when the alternating current windings are under full load, and the alternating current windings of each phase being so arranged and connected that under full load conditions a change in the level of saturation in any one reactor core relative to the bias level due to the bias winding is accompanied by a compensating change in saturation level in another core or cores, current limiting occurring when on each half-cycle one of the cores is forced out of saturation.

6. A current-limiting device as claimed in claim 5 wherein said auxiliary direct current bias winding is in the form of a magnetic flux screen surrounding said superconducting winding.

7. A current-limiting device as claimed in claim 1 wherein said screen forms the outer vessel of a vacuum enclosure surrounding said superconducting winding.

8. A current-limiting device as claimed in claim 7 in which said evacuated enclosure has an inner vessel surrounding said superconducting winding and means suspending said inner vessel within said outer vessel.

9. A current-limiting device as claimed in claim 8 in which said suspension means comprise tensioned ropes following a zig-zag path in a vertical plane between said inner and outer vessels above and below the inner vessel.

10. A current-limiting device as claimed in claim 9 in which the superconducting winding and the screen form a loop disposed in a horizontal plane.

11. A current-limiting device for an alternating current system comprising for each phase of the system at least two saturable reactors, each reactor comprising an iron core, an alternating-current winding on said core, a superconducting direct current bias winding linking said core, and an alternating current shunt winding linking said core, said shunt winding being a loop disposed in parallel with but electrically independent of said bias winding, said bias winding being common to the reactors of the said phase and establishing a bias level of saturation in the reactor cores such that the reactor cores are maintained saturated when the alternating current windings are under full load, and the alternating current windings of each phase being so arranged and connected that under full load conditions a change in the level of saturation in any one reactor core relative to the bias level due to the bias winding is accompanied by a compensating change in saturation level in another core or cores, current limiting occurring when on each half-cycle one of the cores is forced out of saturation.

12. A current-limiting device as claimed in claim 11 comprising a controllable direct-current source connected to said shunt winding to supply current to said shunt winding and thereby vary the flux in the reactor cores.

13. A current-limiting device for an alternating current system comprising for each phase of the system a pair of saturable reactors, each reactor having an iron core, an alternating current winding on the core, and a superconducting direct current bias winding linking the core, the bias winding being common to the reactor cores of that phase and capable of maintaining the cores saturated when the alternating current windings are under full load, an electrically-conducting screen enclosing said bias winding to shield the bias winding against alternating magnetic flux, said screen forming a circuit electrically separate from but physically parallel to said bias winding, and the alternating current windings of said pair of reactors being connected in series opposition with respect to the bias winding whereby under full load conditions an increase in the saturation level in one core is compensated by a decrease in the saturation level in the other core whereas under fault conditions current is limited as the cores are alternately forced out of saturation on successive half-cycles.

* * * * *